United States Patent [19]

Harvey et al.

[11] Patent Number: 4,650,579
[45] Date of Patent: Mar. 17, 1987

[54] CLARIFIERS

[75] Inventors: Ross H. Harvey; Graham W. Wöbcke; Antony W. Rogers; Robert R. Fenwick, all of Brisbane, Australia

[73] Assignee: Dunlop Olympic Limited, Yeerongpilly, Australia

[21] Appl. No.: 727,440

[22] Filed: Apr. 26, 1985

[30] Foreign Application Priority Data

Apr. 30, 1984 [AU] Australia .............................. PG4759

[51] Int. Cl.⁴ ........................ C02F 1/52; B01D 21/08
[52] U.S. Cl. .................................. 210/199; 210/206; 210/208; 210/519; 210/522
[58] Field of Search .............. 210/702, 738, 802, 199, 210/205–208, 521, 522, 519

[56] References Cited

U.S. PATENT DOCUMENTS

| | | | |
|---|---|---|---|
| 2,425,371 | 8/1947 | Green | 210/802 |
| 3,615,025 | 10/1971 | Rice et al. | 210/521 |
| 4,136,012 | 1/1979 | Louboutin et al. | 210/521 |
| 4,172,789 | 10/1979 | Huardeau | 210/802 |
| 4,199,451 | 4/1980 | Hsiung et al. | 210/521 |
| 4,251,361 | 2/1981 | Grimsley | 210/703 |

FOREIGN PATENT DOCUMENTS

| | | | |
|---|---|---|---|
| 2050338 | 1/1981 | United Kingdom | 210/522 |
| 919700 | 4/1982 | U.S.S.R. | 210/521 |

*Primary Examiner*—Peter Hruskoci
*Attorney, Agent, or Firm*—Cushman, Darby & Cushman

[57] ABSTRACT

A clarifier for treatment of water and other liquids including a housing having a generally channel shaped member having an inlet arm and an outlet arm. The inlet arm forms a flocculation zone and the outlet arm forms a settling zone.

The inlet arm may be provided with means for causing influent to travel a tortuous or serpentine flow path and the settling zone may include settling means so as to increase the effective surface area of the settling zone. Suitably both the inlet arm and outlet arm are substantially parallel to each other with the inlet arm being spaced from and located upwardly of the outlet arm.

A sludge collection zone may be provided at the junction of the inlet arm and the outlet arm and may have associated therewith one or mroe sludge removal conduits.

7 Claims, 2 Drawing Figures

CLARIFIERS

This invention relates to an improved clarifier for treatment of water and other liquids.

One conventional clarifier includes a housing having an influent inlet and an effluent exit. The housing has a base wall or floor having a pair of mutually adjacent sloping surfaces comprising a front sloping surface and a rear sloping surface. A settling unit is attached to the rear sloping surface comprising a plurality of parallel plates or surfaces. The arrangement is such that water under treatment may flow from an external flocculation tank which may be equipped with a series of baffles or alternatively an agitator to the influent inlet. The water may then pass downwardly by gravitation along the front sloping surface and then upwardly so that it passes through the settling unit. In the lowermost position of the housing sludge may be collected and the sludge may be subsequently passed via suitable conduits to a dewatering device. After passing through the settling unit the treated water may then pass through the effluent exit.

It was found in practice that the above mentioned clarifier was a very bulky system which was not adapted for installation in a limited area or space because it comprised the above mentioned housing and an external flocculation tank.

In another conventional system there is provided a large tank having an inlet at the top of one side wall thereof which passes into a mixing chamber equipped with a paddle or agitator. There is also provided a sloping baffle which separates the mixing chamber from a flocculation zone wherein the floc collects on a rear surface of the sloping baffle which is spaced from the base of the tank to allow water to flow thereunder. At this location sludge may be collected from the water. There also may be provided an upright baffle separating the flocculation zone from a "wet well" or effluent collection zone. The water after passing through the floc may then pass over or through the top position of the upright baffle.

While the above mentioned unit is satisfactory for large scale industrial applications it was again found that the tank was not adapted for installation in a limited area or space because of the size of the tank.

It therefore is an object of the invention to provide a clarifier which is suitable for installation in a restricted area or space and is efficient in operation.

The clarifier of the invention includes a housing having a generally channel shaped chamber comprising an inlet arm and an outlet arm wherein said inlet arm forms a flocculation zone and the outlet arm forms a settling zone. Suitably, the base of the U may form a sludge collection zone.

Preferably both inlet arm and outlet arm are substantially parallel to each other with the inlet arm spaced from and located upwardly or above th outlet arm.

The term "channel shaped" as used herein means that the chamber may also be substantially V shaped, U shaped, W shaped or other of another suitable shape including an initial flocculation zone which merges into a sludge collection zone before forming a settling zone.

The inlet arm may communicate with or be associated with an inlet port, conduit or passage and the flocculation zone is also suitably provided with agitation means or a series of baffles to provide appropriate mixing of the influent. Preferable however there is provided a plurality of baffles each attached to the interior surface of the flocculation zone so as to promote a circuitous, tortuous or serpentine influent flow path. In this arrangement preferably each adjacent baffle is spaced from each other and is attached to opposite positions of the interior surface of the flocculation zone to achieve this flow path.

The sludge collection zone suitably occurs at the junction of the flocculation zone and the settling zone and may be provided with appropriate sludge removal conduits associated with a sludge dump.

The settling zone may be provided with suitable settling means so as to increase the effective surface area of the settling zone. In one form this may comprise a plurality of spaced parallel plates or in another form this may comprise a plurality of tubes spaced from or attached to each other.

Preferably the channel shaped chamber is of constant diameter and it is preferred that the outlet arm is oriented substantially parallel to the inlet arm so as to achieve a relatively uniform flow pattern so that the floc particles do not have their size interrupted by abrupt changes in direction or flow rate.

The outlet arm may also communicate with or be associated with an outlet port, passage or conduit whereby the treated liquid may be discharged to a filter tank for further processing. Suitably an outlet port is located at the top of the settling zone.

Reference may now be made to a preferred embodiment of the invention as shown in the attached drawings which illustrates a preferred clarifier constructed in accordance with the invention.

Figure 1:
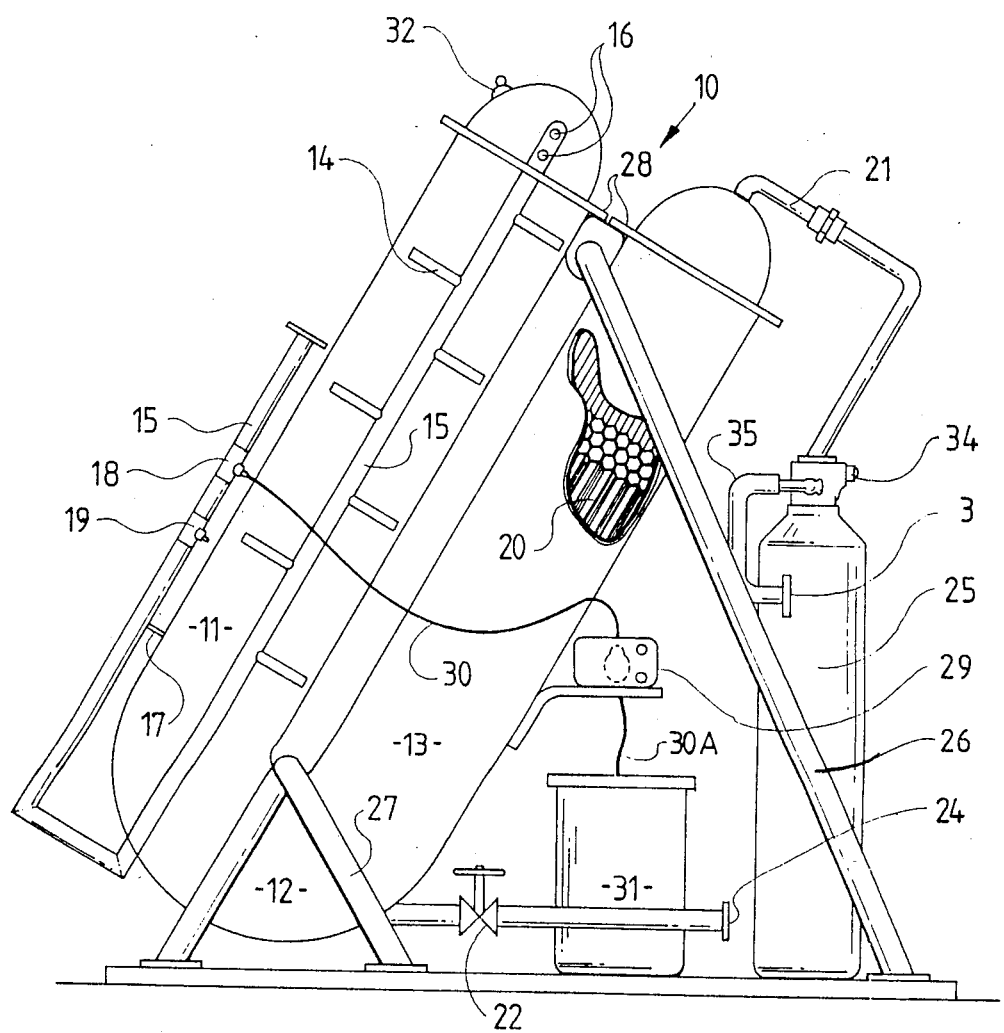
FIG. 1 represents a schematic view of the clarifier.

The clarifier as shown in the drawings includes a U shaped housing 10 having a flocculation zone 11 a sludge collection zone 12 and a settling zone 13. Flocculation zone 11 is provided with a plurality of baffles 14 having a staggered arrangement as shown so as to enable the influent to have a substantially serpentine flow through flocculation zone 11. Water enters zone 11 through inlet tube 15 attached to housing 10 by brackets 17. The tube 15 may be provided with a flow control valve (not shown) which may maintain a constant controlled flow into zone 11 of around 22.6 liters/minute. The influent travels downwardly and then upwardly through inlet tube 15 as shown before discharge into flocculation zone 11 through apertures 16. Chemicals such as chlorine may be injected into the influent as well as coagulant at 18 or 19. The passage through flocculation or mixing zone 11 encourages the formation of floc whereby colloidal particles contained in the influent may be aggregated together by the action of the coagulant. The water may then pass into settling zone 13 having a plurality of settlement tubes 20 combined therein as shown where floc and water are separated. Clarified water rises and leaves zone 13 through exit or outlet tube 21 while the separated floc slowly settles to the bottom of housing 10 in the sludge collection zone 12. Periodically the sludge through the action of throttle valve 22 may be drained off through conduit 24 to a sludge dump (not shown). Throttle valve 22 may adjust the volume and rate of drawing off of the sludge through conduit 24.

The clarified water may then be passed to multi media filter tank 25 where suspended solids may be removed before the water passes into service. There is also shown support brackets 26 and 27 for supporting the housing 10. As shown in FIG. 1 baffles 14 are attached to inlet pipe 15 and thus the baffle inlet pipe assembly may be withdrawn from the interior of zone 11 when required for maintenance and cleaning purposes. It will also be appreciated however that baffles 14 may be attached to the interior of zone 11 if desired in a variation of the embodiment shown in FIG. 1.

There is also shown cap members 28 which are attached to zones 11 and 13 of housing 10 as well as chemical feeding apparatus 29 which has hose 30 which may be attached to points 18 or 19 previously described. Chemicals may be obtained from tank 31 which is associated with feeding apparatus 29 via hose 30A. There is also shown air bleed valve attachment point 32 as well as outlet 33 from filter tank 25 backward valve 34 and conduit 35.

Figure 2:
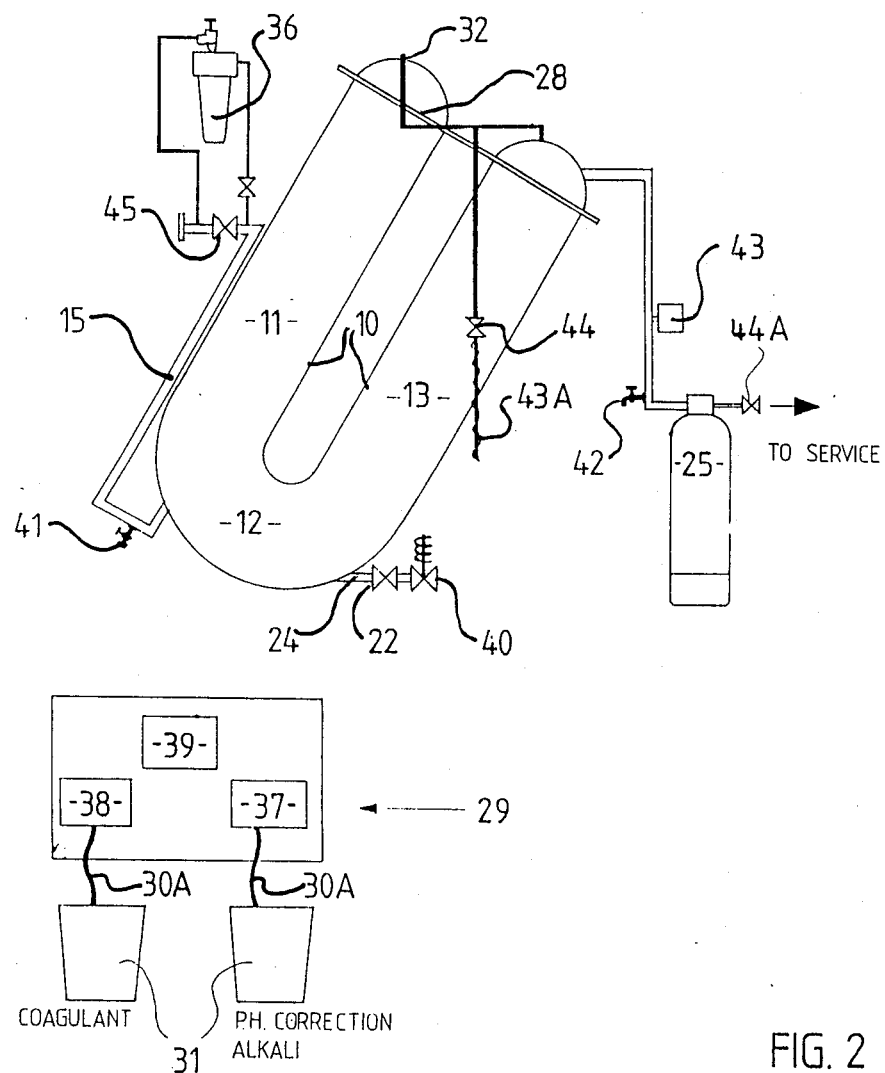
FIG. 2 represents a schematic view of a treatment plant utilizing the clarifier of FIG. 1.

In the treatment plant shown in FIG. 2 there is also shown chlorine dosage feeder 36, feed pump 37 for coagulant, feed pump 38 for soda ash used for pH correction, control panel 39 which all form part of the chemical feeding apparatus 29. There is also shown solenoid valve 40 associated with sludge conduit 24, sample points 41 and 42, flow switch 43, air bleed valve 44, make up hose 43A, service stop valve 44A, and flow control valve 45.

It will be appreciated from the foregoing that the clarifier of the invention is extremely compact and can be used in areas of limited storage space while still providing an efficient treatment of water and other liquids.

We claim:

1. A clarifier for treatment of water and other liquids comprising:
   a housing, being closed and pressurizable, said housing including,
      a chamber, being generally channel shaped and substantially defining the periphery of said housing,
      a first portion of said housing forming an inlet arm having a fluid inlet means, said inlet arm forming a flocculation zone in said chamber having means for causing influent to travel a tortuous flow path,
   a second portion of said housing forming an outlet arm having a fluid outlet means, said outlet arm forming a settling zone in said chamber having means for increasing the effective surface area of said settling zone, said outlet arm and said inlet arm being substantially parallel to each other with said inlet arm being spaced by a predetermined distance from and located above, said outlet arm, and
   a sludge collection zone located at the junction of said flocculation zone and said settling zone in said chamber, said sludge collection zone having at least one sludge removal conduct.

2. A clarifier as claimed in claim 1 wherein said flocculation zone includes a plurality of baffles spaced from each other and attached to opposite locations of said flocculation zone in staggered relationship.

3. A clarafier as claimed in claim 1 wherein the settling zone includes a plurality of substantially parallel tubes spaced from or attached to each other.

4. A clarifier as claimed in claim 1 wherein the settling zone includes a plurality of spaced parallel plates.

5. A clarifier as claimed in claim 1 wherein said inlet means includes an inlet pipe whereby influent is discharged through inlet apertures in a top part of the inlet arm.

6. A clarifier as claimed in claim 1 wherein said outlet arm has said outlet means located in a top portion thereof.

7. A treatment plant for treatment of water and other fluids comprising:
   a clarifier including,
      a housing, being closed and pressurizable, said housing having,
      a chamber, being generally channel shaped and substantially defining the periphery of said housing,
      a first portion of said housing forming an inlet arm having a fluid inlet means, said inlet arm forming a flocculation zone in said chambers, said flocculation zone having means for causing influent to travel a tortuous flow path,
   a second portion of said housing forming an outlet arm having a fluid outlet means, said outlet arm forming a settling zone in said chambers having means for increasing the effective surface area of said settling zone, said outlet arm and said inlet arm being substantially parallel to each other with said inlet arm being spaced by a predetermined distance from and located above, said outlet arm, and
   a sludge collection zone located at the junction of said flocculation zone and said settling zone in said chamber, said sludge collection zone having at least one sludge removal conduit; and
   means for feeding chemicals to said inlet arm including,
      means for pumping a coagulant under pressure through a conduit to said inlet arm,
      means for pumping an alkali under pressure through a conduit to said inlet arm, and
      means for metering soluble chlorine to said inlet arm.

* * * * *